United States Patent [19]
Ohshita et al.

[11] Patent Number: 5,640,614
[45] Date of Patent: *Jun. 17, 1997

[54] CAMERA CAPABLE OF PANORAMA PHOTOTAKING

[75] Inventors: Koichi Ohshita, Tokyo; Atsushi Shibayama, Kawasaki; Susumu Sato, Chiba, all of Japan

[73] Assignee: Nikon Corporation, Tokyo, Japan

[*] Notice: The term of this patent shall not extend beyond the expiration date of Pat. No. 5,436,683.

[21] Appl. No.: 406,172

[22] Filed: Mar. 17, 1995

Related U.S. Application Data

[63] Continuation of Ser. No. 305,760, Sep. 14, 1994, Pat. No. 5,436,683, which is a continuation of Ser. No. 177,191, Jan. 3, 1994, abandoned, which is a continuation of Ser. No. 773,548, Oct. 9, 1991, abandoned.

[30] Foreign Application Priority Data

Oct. 16, 1990  [JP]  Japan ................................. 2-277300

[51] Int. Cl.⁶ .................................................. G03B 17/02
[52] U.S. Cl. ................................................. 396/72; 396/435
[58] Field of Search ........................ 354/159, 94, 195.1, 354/195.12; 396/72, 435

[56] References Cited

U.S. PATENT DOCUMENTS

| | | | |
|---|---|---|---|
| 4,911,539 | 3/1990 | Tsunashima et al. | 359/676 |
| 4,929,069 | 5/1990 | Shibayama | 359/692 |
| 5,255,030 | 10/1993 | Mukai et al. | 354/159 |
| 5,436,683 | 7/1995 | Ohshita et al. | 354/159 |

FOREIGN PATENT DOCUMENTS

| | | |
|---|---|---|
| 1250917 | 10/1989 | Japan . |
| 273322 | 3/1990 | Japan . |

*Primary Examiner*—David M. Gray
*Attorney, Agent, or Firm*—Shapiro and Shapiro

[57] ABSTRACT

In a phototaking lens with the focal length variable from a predetermined value at the wide-angle end position to another predetermined value at the telephoto end position, a part of lens elements constituting the phototaking lens is rendered movable relative to other lens components. There is provided means for converting the lens, by the relative movement of a part of the lens elements, to a panorama state with a focal length even shorter than that at the wide-angle end position. The phototaking lens is a zoom lens having a first lens group of a positive refractive power and a second lens group of a negative refractive power in the order from the object side, wherein the focal length is varied by a change in the distance between the first and second lens groups, and the panorama state is obtained by a relative movement of the first lens group relative to the second lens group.

17 Claims, 5 Drawing Sheets

1

CAMERA CAPABLE OF PANORAMA PHOTOTAKING

This is a continuation of application Ser. No. 08/305,760 filed Sep. 14, 1994, now U.S. Pat. No. 5,436,683; which is a continuation of application Ser. No. 08/177,191 filed Jan. 3, 1994 (abandoned); which is a continuation of application Ser. No. 07/773,548 filed Oct. 9, 1991 (abandoned).

BACKGROUND OF THE INVENTION

1. Field of the Invention

The present invention relates to a camera capable of panorama phototaking.

2. Related Background Art

A panorama camera has a frame size extended in the horizontal direction, for example as shown in FIG. 2A, in comparison with the ordinary frame size, and is therefore suited for photographing, for example, a wide landscape.

However, because of the special frame size, such panorama photographs could not be developed or printed in ordinary photoprocessing laboratories, and could not, therefore, be handily enjoyed by photographers other than professional photographers or certain advanced amateurs.

On the other hand, there has recently been developed a frame size, utilizing the 35 mm film (JIS 135) and contracted vertically from so-called Leica size of 24×36 mm shown in FIG. 2B, and this size is gaining popularity. This new frame size will hereinafter be called panorama size. The panorama size is 13×36 mm as shown in FIG. 2C, the same as the Leica size in the horizontal direction. Consequently the film development and printing can be made with the conventional laboratory equipment, and, in combination with the simultaneous commercialization of so-called disposable cameras exclusively for the panorama size, this size is rapidly gaining popularity as the panorama size handily available also for general amateur photographers.

Also this panorama size, having the same horizontal size as that of the Leica size, provides a significant advantage to the cameras in that a camera switchable between the Leica size and the panorama size can be easily realized.

SUMMARY OF THE INVENTION

Though this method can certainly provide a panorama photograph, the image angle inevitably becomes smaller than in the ordinary state of use. This is a significant disadvantage since the panorama photography aims at photographing a wide object field. For overcoming such disadvantage, there can be conceived the use of a phototaking lens with a wide image angle.

However, since a wider image angle is difficult to achieve in optical designing, increases in the entire camera size and in the cost are unavoidable, due to increases in the number of lens elements and in the lens diameter.

An object of the present invention, therefore, is to provide a camera capable of panorama photography with a wider image angle, without complication in the structure of the phototaking lens and with compactness of the entire camera dimensions.

The above-mentioned object can be attained, according to the present invention, by a phototaking lens with the focal length variable from a predetermined value at the wide angle end to another predetermined value at the telephoto end, wherein a part of lens elements constituting said phototaking lens is rendered movable relative to other lens components, and there is provided means for converting the lens, by said relative movement of a part of the lens elements, to a panorama state with a focal length even shorter than that at said wide angle end. Said phototaking lens is a zoom lens having a first lens group G1 of a positive refractive power and second lens group G2 of a negative refractive power in the order from the object side, wherein the focal length is varied by a change in the distance between said first and second lens groups G1, G2, and said panorama state is obtained by a relative movement of said first lens group G1 relative to said second lens group G2. The focal length fp in said panorama state preferably satisfies a condition:

$$0.80 < fp/fw < 0.95 \qquad (1)$$

wherein fw is the focal length at said wide angle end.

FIG. 1 is a schematic view showing the concept of the present invention. In the following description, the present invention will be explained, as an example, by a zoom lens of two-group structure often employed in compact lens-shutter cameras, consisting of a first lens group G1 of a positive refractive power and a second lens group G2 of a negative refractive power.

For the purpose of simplicity, a diaphragm (not shown in FIGS. 1A and 1B) is assumed to be positioned at the first lens group G1, and F indicates the film plane. FIG. 1A illustrates the wide angle end position in normal state, while FIG. 1B illustrates the wide angle end position in the panorama state, with a focal length even shorter than that in the normal wide angle end position.

The panorama state is attained by the movements of the first and second lens groups G1, G2 toward the image side, with an increase in the distance therebetween, said distance being larger than in the normal wide angle end position.

In the normal state, a principal ray 1 reaching a diagonal corner point of the film plane F enters with an incident angle $\theta1$, then enters the second group G2 with a height h1 and reaches the film plane. On the other hand, in the panorama state with a shorter focal length, a principal ray reaching the diagonal corner point of normal image frame size enters with an incident angle $\theta2$, larger than $\theta1$, as indicated by a broken line 2, and enters the second group G2 with a larger height h2 than h1. A larger incident angle $\theta$ increases the difficulty of correction of aberrations in the first group G1, while an increased height h of the principal ray in the second group G2 increases the diameter thereof and the difficulty of correction of aberrations therein. Thus increases in the number of lens components and in the dimension thereof are unavoidable in a wider image angle.

However, if such state of shorter focal length is limited to the panorama size, the necessary image circle can be reduced because the image frame is cut off in the vertical direction, so that the incident angle of the principal ray and the height thereof in the second group G2 are reduced to $\theta3$, h3 as indicated by a solid line 3. Therefore, if $\theta3$ and h3 mentioned above are assumed to be substantially equal to or smaller than $\theta1$ and h1, the shorter focal length in the panorama size can be easily realized without increased difficulty for correction of aberrations or increased dimension of the second group G2. This is because, under the assumption that certain correction of aberrations is made in each group, the rays 1 and 3 should behave the same after passing the first group G1 if $\theta1$ and $\theta3$ are mutually the same, and the aberrations generated in the second group G2 should be approximately the same for the rays 1 and 3 if h1 and h3 are mutually the same. This suggests that, if the aberrations are corrected at the wide angle end position in the normal state, the aberrations are automatically corrected to a certain extent also at the panorama state of a shorter focal length. Also the diameter of the second group G2 does not increase if h1 and h3 are equal.

In the present invention, the condition (1) is determined based on the above-mentioned facts. Below the lower limit of the condition (1), θ3 and h3 become larger than θ1 and h1, so that the aberrations in the panorama state become difficult to correct and the second group G2 inevitably becomes larger. On the other hand, above the upper limit of said condition, the increase of image angle at the panorama size is limited and does not meet the purpose of the present invention.

As explained in the foregoing, the present invention makes it possible to obtain a camera capable of wide-angle panorama photography with a simple operation, with compactness of the entire camera and without complication in the structure of the phototaking lens.

DESCRIPTION OF THE PREFERRED EMBODIMENTS

Now the present invention will be clarified in detail by preferred embodiments thereof, shown in the attached drawings. All the following 1st, 2nd and 3rd embodiments provide zoom lenses of the above-mentioned two-group structure.

Figure 1A:
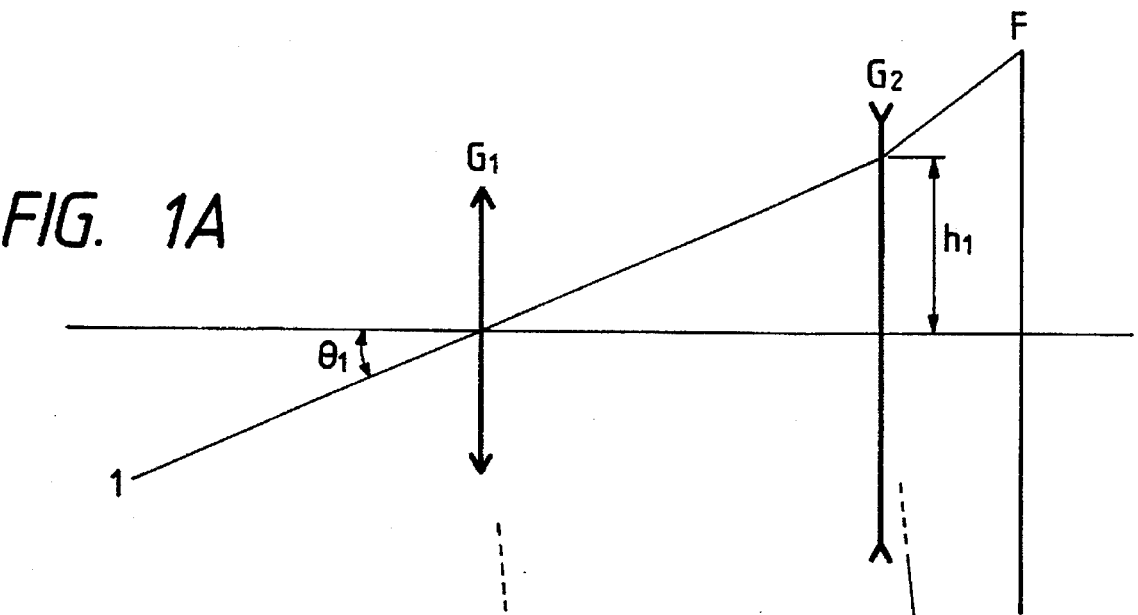
FIGS. 1A and 1B are schematic views showing the concept of the present invention.
Figure 1B:
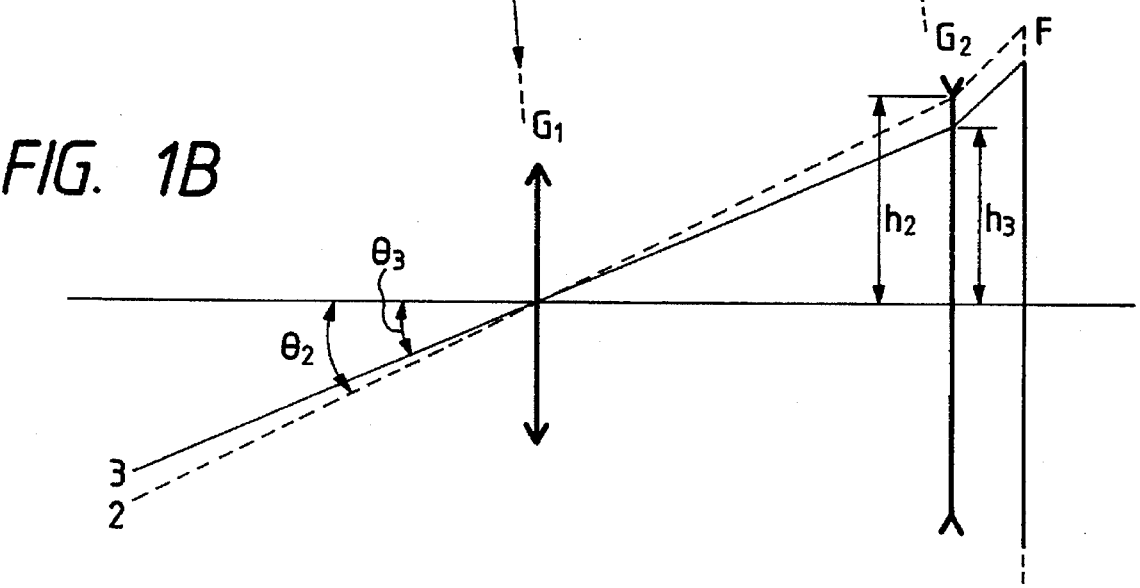
Figure 2A:
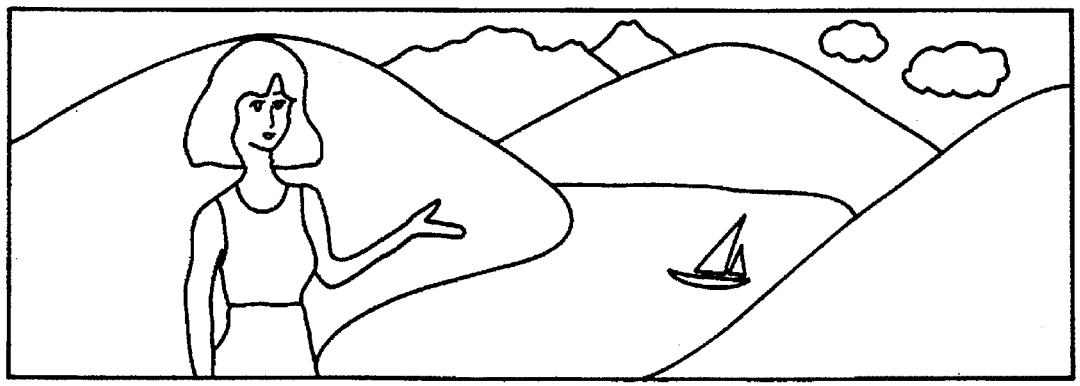
FIGS. 2A, 2B and 2C are respectively views showing an example of panorama-sized photograph, a film with Leica frame size and a film with panorama frame size.
Figure 2B:
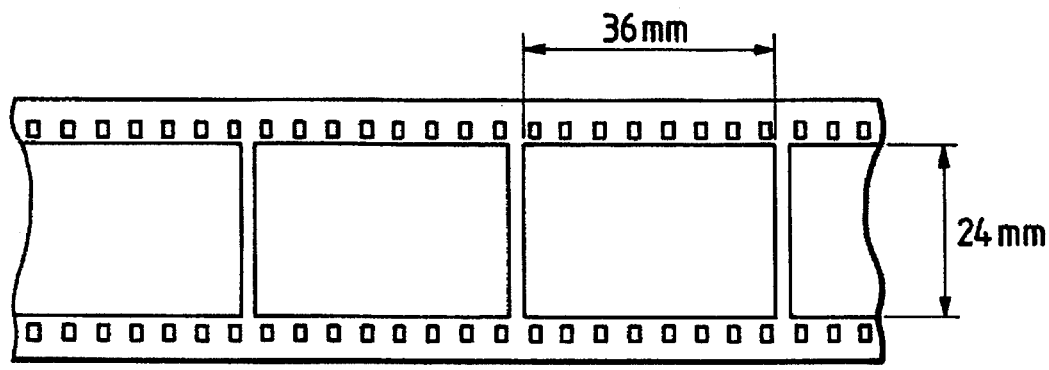
Figure 2C:
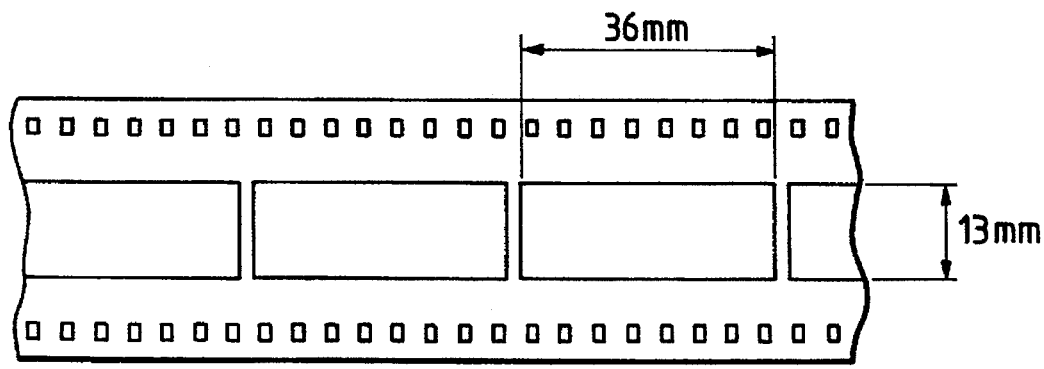
Figure 3:
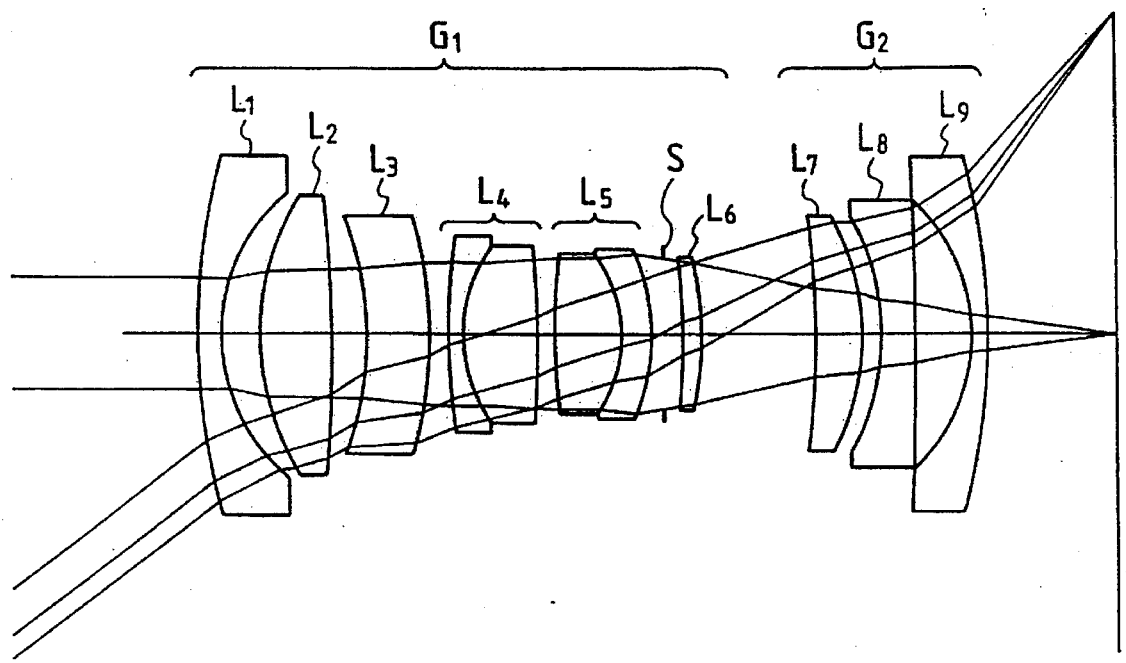
FIG. 3 is a cross-sectional view showing the optical path of a first embodiment in the normal wide-angle end position.
Figure 4:
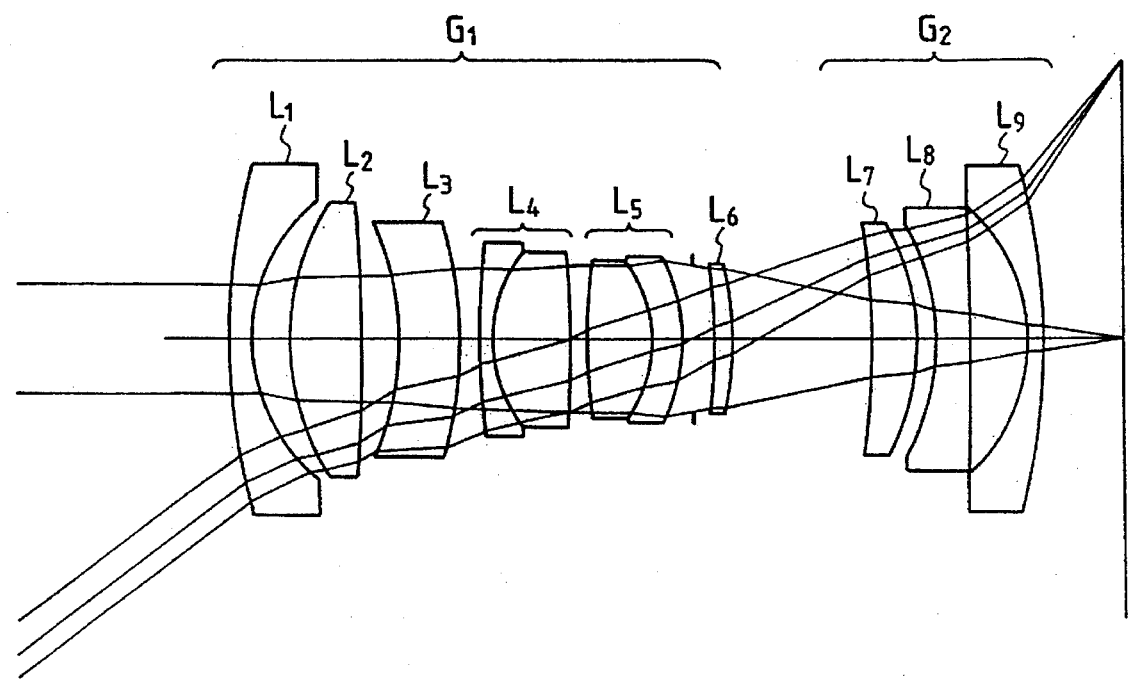
FIG. 4 is a cross-sectional view of the first embodiment at the panorama state.

FIGS. 3 and 4 are views showing the lens structure and the optical path in a first embodiment, wherein the first lens group G1 is composed, in the order from the object side, of a negative meniscus lens L1 convex to the object side, a biconvex lens L2, a negative meniscus lens L3 convex to the image side, an adhered lens L4 consisting of a negative meniscus lens convex to the object side and a biconvex lens, an adhered lens L5 consisting of a biconvex lens and a negative meniscus lens convex to the image side, a diaphragm S, and a positive meniscus lens L6 convex to the image side, while the second lens group G2 is composed of a positive meniscus lens L7 convex to the image side, a negative meniscus lens L8 convex to the image side, and a negative meniscus lens L9 convex to the image side.

Figure 5:
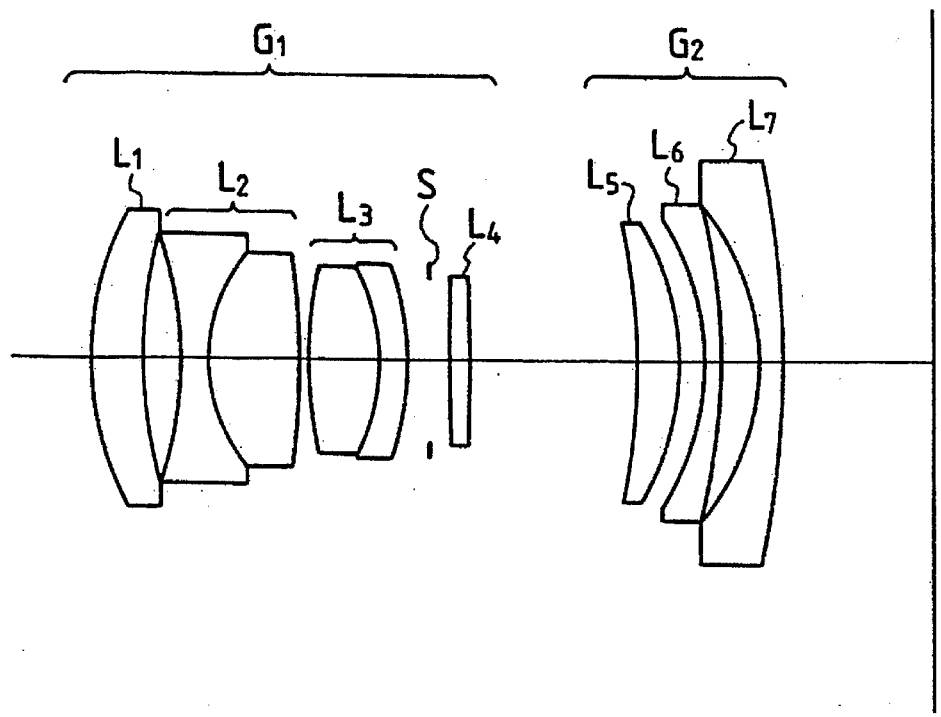
FIGS. 5 and 6 are cross-sectional views of lens structure of 2nd and 3rd embodiments.

FIG. 5 is a view showing the lens structure of a 2nd embodiment, wherein the first lens group G1 is composed, in the order from the object side, of a positive meniscus lens L1 convex to the object side, an adhered lens L2 consisting of a biconcave lens and a biconvex lens, an adhered lens L3 consisting of a biconvex lens and a negative meniscus lens convex to the image side, a diaphragm S, and a biconvex lens L4, while the second lens group G2 is composed of a positive meniscus lens L5 convex to the image side, a negative meniscus lens L6 convex to the image side, and a negative meniscus lens L7 convex to the image side.

Figure 6:
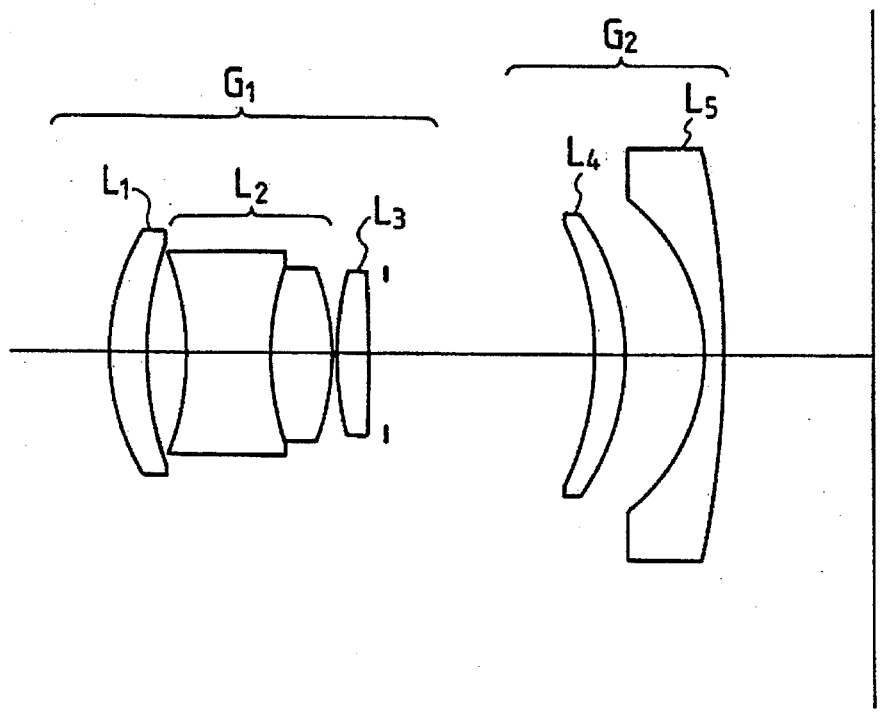

FIG. 6 is a view showing the lens structure of a 3rd embodiment, wherein the first lens group G1 is composed, in the order from the object side, of a positive meniscus lens L1 convex to the object side, an adhered lens L2 consisting of a biconcave lens and a biconvex lens, L3 and a biconvex lens, then a diaphragm S is placed, and the second lens group G2 is composed of a positive meniscus lens L4 convex to the image side and a negative meniscus lens L5 convex to the image side.

As explained above, each of the 1st, 2nd and 3rd embodiments is composed of a first lens group of a positive refractive power and a second lens group of a negative refractive power, both of which move to the image side, with an increase in the distance therebetween, so that the amount of movement is larger in the second lens group than in the first lens group. These embodiments reach the panorama state by similar operations.

For assisting the understanding, the state of rays in the 1st embodiment in the normal wide-angle end position is shown in FIG. 3, and that in the panorama state is shown in FIG. 4.

Parameters of these embodiments are shown in the following, wherein r is the radius of curvature of a lens face, d is the distance between lens faces, n is the refractive index for d line ($\lambda$=587.6 nm), and $\nu$ is Abbe's number.

1st embodiment

Focal length f=28.8~58.5

F-number FN=3.8~7.7

Focal length in panorama state fp=25.5 (~58.5)

F-number in panorama state FN=3.3 (~7.7)

| | r | d | v | n |
|---|---|---|---|---|
| 1 | 46.166 | 1.50 | 45.4 | 1.79668 |
| 2 | 12.395 | 2.80 | | |
| 3 | 18.885 | 4.80 | 38.2 | 1.65128 |
| 4 | −106.837 | 2.50 | | |
| 5 | −20.651 | 4.20 | 40.9 | 1.79631 |
| 6 | −27.033 | 1.30 | | |
| 7 | 58.849 | 1.00 | 40.9 | 1.79631 |
| 8 | 10.254 | 5.20 | 46.5 | 1.58267 |
| 9 | −69.455 | 1.20 | | |
| 10 | 50.257 | 4.60 | 56.5 | 1.50137 |
| 11 | −8.928 | 2.00 | 25.4 | 1.80518 |
| 12 | −13.158 | 2.28 | | |
| 13 | −36.427 | 1.20 | 49.1 | 1.53172 |
| 14 | −24.236 | (variable) | | |
| 15 | −51.853 | 3.30 | 45.4 | 1.79668 |
| 16 | −16.420 | 1.40 | | |
| 17 | −15.631 | 2.30 | 51.1 | 1.73350 |
| 18 | −179.827 | 4.00 | | |
| 19 | −12.430 | 1.00 | 51.1 | 1.73350 |
| 20 | −47.047 | | | |
| f | 28.7998 | 58.5001 | 25.5033 | |
| d14 | 8.1969 | 1.7236 | 9.8450 | |
| Bf | 9.0778 | 39.8330 | 5.6642 | |
| | fp/fw = 0.8855 | | | |

2nd embodiment

Focal length f=36.0~78.0

F-number FN=3.6~7.7

Focal length in panorama state fp=32.0 (~78.0)
F-number in panorama state FN=3.2 (~7.7)

|     | r        | d          | ν       | n       |
| --- | -------- | ---------- | ------- | ------- |
| 1   | 18.084   | 3.30       | 58.5    | 1.65160 |
| 2   | 29.635   | 2.20       |         |         |
| 3   | −25.459  | 2.00       | 45.4    | 1.79668 |
| 4   | 9.975    | 5.80       | 41.5    | 1.57501 |
| 5   | −58.500  | 0.60       |         |         |
| 6   | 27.987   | 4.50       | 57.0    | 1.62280 |
| 7   | −11.960  | 1.70       | 23.0    | 1.86074 |
| 8   | −17.739  | 2.65       |         |         |
| 9   | 162.697  | 1.20       | 32.2    | 1.67270 |
| 10  | −162.697 | (variable) |         |         |
| 11  | −40.199  | 2.70       | 28.6    | 1.79504 |
| 12  | −16.389  | 1.70       |         |         |
| 13  | −15.798  | 1.20       | 33.9    | 1.80384 |
| 14  | −37.517  | 2.30       |         |         |
| 15  | −14.368  | 1.30       | 45.4    | 1.79668 |
| 16  | −67.522  |            |         |         |
| f   | 36.0437  | 78.0045    | 32.0001 |         |
| d10 | 10.6820  | 1.4270     | 12.8560 |         |
| Bf  | 9.5164   | 49.7122    | 5.6429  |         | fp/fw = 0.8878

3rd embodiment

Focal length f=36.0~68.0

F-number FN=4.1~7.6

Focal length in panorama state fp=32.0 (~68.0)

F-number in panorama state FN=3.7 (~7.6)

|     | r        | d          | ν       | n       |
| --- | -------- | ---------- | ------- | ------- |
| 1   | 13.892   | 2.50       | 70.1    | 1.51860 |
| 2   | 22.716   | 2.50       |         |         |
| 3   | −17.043  | 5.50       | 40.9    | 1.79631 |
| 4   | 18.350   | 3.80       | 60.3    | 1.51835 |
| 5   | −13.767  | 0.20       |         |         |
| 6   | 20.018   | 2.00       | 54.0    | 1.61720 |
| 7   | −149.137 | (variable) |         |         |
| 8   | −18.644  | 1.90       | 25.5    | 1.80458 |
| 9   | −15.153  | 5.00       |         |         |
| 10  | −12.749  | 1.30       | 40.9    | 1.79631 |
| 11  | −56.845  | 9.50       |         |         |
| f   | 36.0696  | 68.0808    | 31.9980 |         |
| d7  | 14.2920  | 4.2854     | 17.0000 |         |
| Bf  | 9.5042   | 43.9258    | 5.1260  |         | fp/fw = 0.8871

The lens data of the foregoing embodiments are based on the prior patent applications of the present applicant (Japanese Patent Application No. 2-37679, Japanese Patent Applications Laid-open Nos. 1-250917 and 2-73322).

Figure 7:
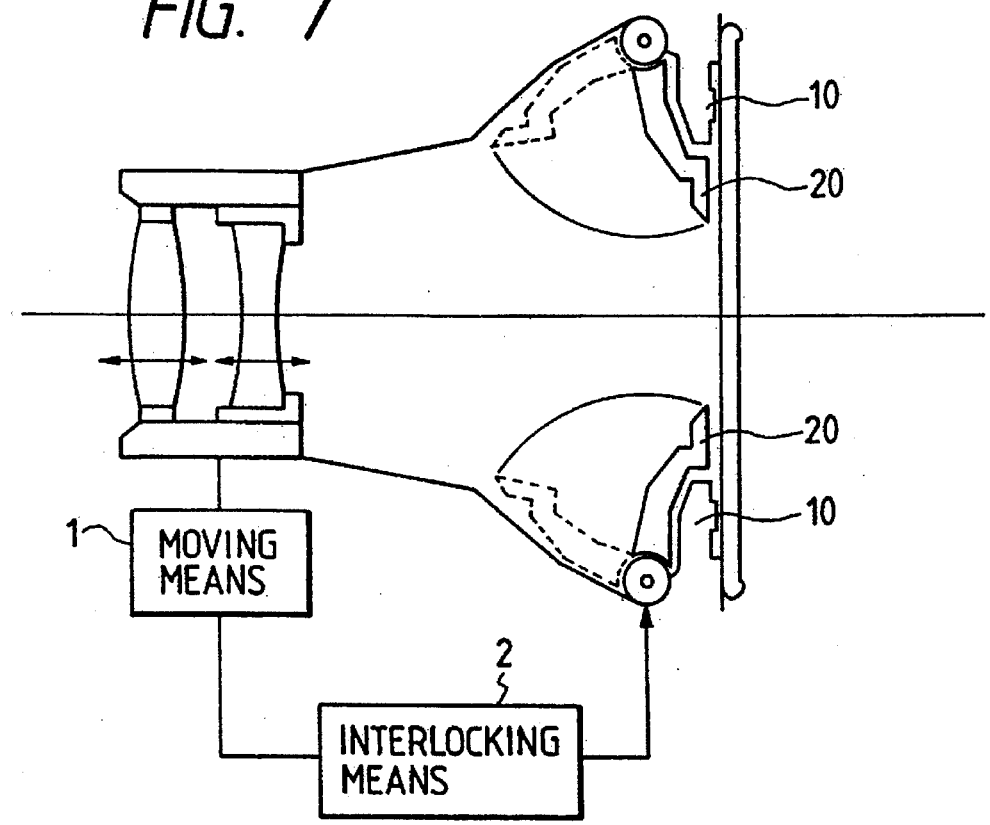
FIG. 7 is a schematic view showing the structure of shield means.

As an embodiment of the present invention, it is also effective to provide a movable shield member 20 in the vicinity of a frame aperture 10 as shown in FIG. 7, in order to switch from the normal Leica size to the panorama size. The frame aperture is positioned at the focal plane or located in the proximity of the focal plane. In this case the first lens group G1 and the second lens group G2 cause mutual movement to the panorama state by moving means 1, and upper and lower shield members 20 are inserted by rotation in front of the film F by means of interlocking means 2.

The interlocking means 2 actuates the movable shield members 20 to shield light rays which travel toward the upper and lower peripheral portion of the focal plane, at the time the moving means 1 moves the lens groups $G_1$, $G_2$ for the panorama state.

However the vertical limitation of the frame aperture by the shield members is not essential to the present invention.

Figure 8:
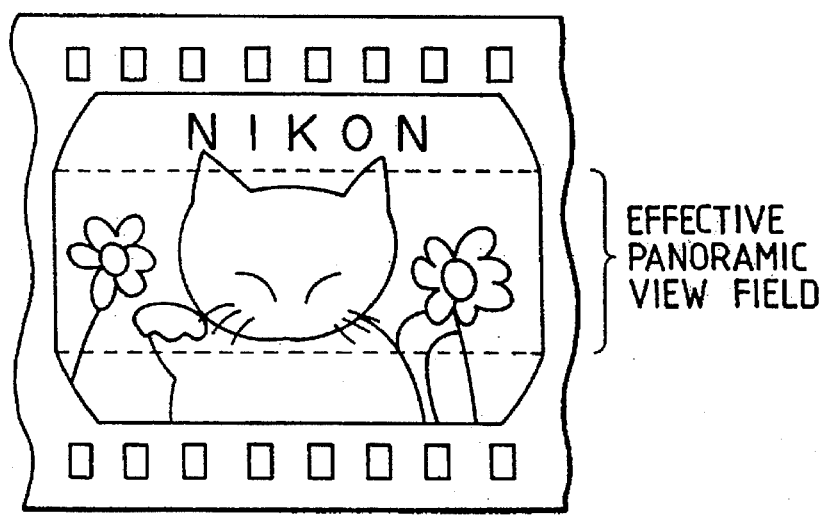
FIG. 8 is a schematic view of a film having an indication for panorama state by identification means.

On the other hand, it is necessary to record, on the film, means for discriminating whether the phototaking is conducted with the panorama size, since otherwise, when the photographer intends to take a photograph with the panorama size, there is a danger that the print is made with the ordinary size with four obscured corners. The aforementioned shielding of the upper and lower portions of the frame aperture is effective as said means for discrimination, but there may also be adopted other means indicating the panorama state, if agreed in advance with the photofinishing laboratory. As an example, there can be conceived, in the phototaking with the panorama size, to record a mark, such as "NIKON", outside the panorama image frame, as shown in FIG. 8. In summary, there may be provided recording means for recording the panorama state on the film.

The effect of the present invention remains the same also in case each lens group is divided into sub groups which respectively function in different manners. It will also be apparent that the present invention is not limited to the zoom lens of aforementioned two-group structure but is applicable to any zoom lens.

In the case of the above-mentioned zoom lens consisting of the first group of a positive refractive power and the second group of a negative refractive power, the total length of the lens in the panorama state is shorter than that in the wide-angle end position. It is therefore possible to reduce the depth of the camera in comparison with the conventional structure, by extending the zoom cam and selecting the lens position of said panorama state of shorter focal length for storage of the camera. In this manner there can be obtained a camera that can be made compacter in carrying and is therefore excellent in portability.

The phototaking operation with the panorama size is not limited to the aforementioned panorama state with the shortest focal length, but is possible over the entire range from said panorama state of the shortest focal length to the normal telephoto end position of the longest focal length. This fact further expands the freedom of representation in image.

What is claimed is:

1. A camera capable of normal and panorama phototaking on a film plane provided with:

a camera body;

a phototaking lens mounted to said camera body for forming an image of an object on said film plane, said phototaking lens having a predetermined wide angle focal length and a predetermined image circle in a normal state;

panorama converting means which converts said phototaking lens into a shorter focal length than said predetermined wide angle focal length and a smaller image circle than said predetermined image circle for converting said normal state into a panorama state; and discriminating means for recording, on said film plane, information designating whether a phototaking has been performed in a panorama state.

2. A camera capable of panorama phototaking according to claim 1, wherein the focal length fp shorter than said predetermined wide angle focal length fw in said panorama state satisfies a condition:

$$0.8 < fp/fw < 0.95.$$

3. A camera capable of panorama phototaking according to claim 2, wherein said phototaking lens has a plurality of lens units and is constructed so that:

said phototaking lens has a rear lens unit having negative refractive power closest to said film plane;

when said phototaking lens has said predetermined wide angle focal length in said normal state, a principal ray reaching a diagonal corner point in a normal picture enters said rear lens unit at a predetermined height;

when said phototaking lens has said shorter focal length in said panorama state, a principal ray reaching a diagonal corner point in a panorama picture whose height is less than the height of said diagonal corner point in a normal picture, enters said rear lens unit at a height substantially equal to said predetermined height.

4. A camera capable of normal and panorama phototaking on a film plane provided with:

a camera body;

a phototaking lens mounted to said camera body for forming an image of an object on said film plane, said phototaking lens having a predetermined wide angle focal length in a normal state;

panorama converting means which converts said phototaking lens into a shorter focal length than said predetermined wide angle focal length for converting said normal state into a panorama state;

discriminating means for recording, on said film plane, information designating whether a phototaking has been been performed in a panorama state; and interlocking means which transmits, to said discriminating means, information on the fact that said panorama converting means has been activated.

5. A camera capable of panorama phototaking according to claim 4, wherein the focal length fp shorter than said predetermined wide angle focal length fw in said panorama state satisfies a condition:

$$0.8<fp/fw<0.95.$$

6. A camera capable of panorama phototaking according to claim 5, wherein said phototaking lens has a plurality of lens units and is constructed so that:

said phototaking lens has a rear lens unit having negative refractive power closest to said film plane;

when said phototaking lens has said predetermined wide angle focal length in said normal state, a principal ray reaching a diagonal corner point in a normal picture enters said rear lens unit at a predetermined height;

when said phototaking lens has said shorter focal length in said panorama state, a principal ray reaching a diagonal corner point in a panorama picture whose height is less than the height of said diagonal corner point in a normal picture enters said rear lens unit at a height substantially equal to said predetermined height.

7. A camera capable of panorama phototaking according to claim 5, wherein said phototaking lens has a predetermined image circle at said predetermined wide angle focal length in normal state, and said phototaking lens has a smaller image circle than said predetermined image circle at said shorter focal length in panorama state.

8. A camera capable of normal and panorama phototaking on a film plane provided with:

a camera body;

a phototaking lens mounted to said camera body for forming an image of an object on said film plane, said phototaking lens having a predetermined wide angle focal length and a predetermined image circle in a normal state;

panorama converting means which converts said phototaking lens into a shorter focal length than said predetermined wide angle focal length and a smaller image circle than said predetermined image circle;

discriminating means for recording, on said film plane, information designating whether a phototaking has been performed in a panorama state;

wherein said phototaking lens has a plurality of lens units and is constructed so that:

said phototaking lens has a rear lens unit having negative refractive power closest to said film plane;

when said phototaking lens has said predetermined wide angle focal length in said normal state, a principal ray reaching a diagonal corner point of a normal image in the film plane enters said rear lens unit at a predetermined height;

when said phototaking lens has said shorter focal length in said panorama state, a principal ray enters said rear lens unit at a height substantially equal to or less than said predetermined height.

9. A camera capable of panorama phototaking according to claim 8, wherein the focal length fp shorter than said predetermined wide angle focal length fw in said panorama state satisfies a condition:

$$0.8<fp/fw<0.95.$$

10. A camera capable of normal and panorama phototaking on a film plane provided with:

a camera body;

a phototaking zoom lens mounted to said camera body for forming an image of an object on said film plane, said phototaking zoom lens having a predetermined focal length at wide angle end in a normal state;

panorama converting means which converts said phototaking zoom lens into a shorter focal length than said predetermined focal length at wide angle end for converting said normal state into a panorama state;

discriminating means for recording, on said film plane, information designating whether a phototaking has been performed in a panorama state; and interlocking means which transmits, to said discriminating means, information on the fact that said panorama converting means has been activated;

wherein said phototaking zoom lens has a plurality of lens units and is constructed so that:

said phototaking zoom lens has a rear lens unit having negative refractive power closest to said film plane;

when said panorama converting means converts said normal state into said panorama state, said camera acts in the following sequence:

said panorama converting means moves at least said rear lens unit toward said film plane to convert said phototaking zoom lens into a shorter focal length than said predetermined focal length;

said interlocking means interlocks said panorama converting means with said discriminating means, and activates said discriminating means; and said discriminating means records on said film plane a sign of a panorama picture.

11. A camera capable of panorama phototaking according to claim 10, wherein the focal length fp shorter than said predetermined focal length fw in said panorama state satisfies a condition:

$0.8 < fp/fw < 0.95$.

12. A camera capable of panorama phototaking according to claim 11, wherein said phototaking zoom lens is constructed so that:

when said phototaking zoom lens has said predetermined focal length in said normal state, a principal ray reaching a diagonal corner point in a normal picture enters said rear lens unit at a predetermined height;

when said phototaking zoom lens has said shorter focal length in said panorama state, a principal ray reaching a diagonal corner point in a panorama picture whose height is less than the height of said diagonal corner point in a normal picture enters said rear lens unit at a height substantially equal to said predetermined height.

13. A camera capable of panorama phototaking according to claim 11, wherein said phototaking zoom lens has a predetermined image circle at said predetermined focal length at wide angle end in normal state, and said phototaking zoom lens has a smaller image circle than said predetermined image circle at said shorter focal length in said panorama state.

14. A camera capable of normal and panorama phototaking on a film plane provided with:

a camera body;

a phototaking zoom lens mounted to said camera body for forming an image of an object on said film plane;

wherein the phototaking zoom lens has focal length range from a predetermined wide angle end to a predetermined telephoto end, has a predetermined image circle covering a diagonal dimension of a normal picture, when the phototaking zoom lens has a range from a predetermined middle focal length zoom set between the predetermined wide angle end and the predetermined telephoto end to a focal length at the predetermined telephoto end and has a smaller image circle than the predetermined image circle for covering a smaller diagonal dimension of a panorama picture than that of the normal picture, when the phototaking zoom lens has a smaller focal length than the predetermined middle focal length;

panorama converting means for changing a usable focal length of the phototaking zoom lens for converting the normal state into a panorama state;

discriminating means for recording, on said film plane, information designating whether a phototaking has been performed in a panorama state; and interlocking means which transmits, to said discriminating means, information on the fact that said panorama converting means has been activated;

wherein the camera is used in the normal state between the predetermined middle focal length and the focal length at the predetermined telephoto end, and is used in the panorama state in the focal length range between the predetermined wide angle end and the predetermined telephoto end.

15. A camera capable of panorama phototaking according to claim 14, wherein said predetermined focal length fp at wide angle end satisfies a condition:

$0.8 < fp/fw < 0.95$ where fw is said predetermined middle focal length.

16. A camera capable of panorama phototaking according to claim 15, wherein said phototaking zoom lens has a plurality of lens units and is constructed so that:

said phototaking zoom lens has a rear lens unit having negative refractive power closest to said film plane;

when said phototaking zoom lens has said predetermined middle focal length in said normal state, a principal ray reaching a diagonal corner point in a normal picture enters said rear lens unit at a predetermined height;

when said phototaking zoom lens has said predetermined focal length at wide angle end in said panorama state, a principal ray reaching a diagonal corner point in a panorama picture whose height is less than the height of said diagonal corner point in a normal picture enters said rear lens unit at a height substantially equal to said predetermined height.

17. A camera capable of panorama phototaking according to claim 15, wherein said phototaking zoom lens has a plurality of lens units and is constructed so that:

said phototaking zoom lens has a rear lens unit having negative refractive power closest to said film plane;

when said phototaking zoom lens has said predetermined middle focal length in said normal state, a principal ray reaching a diagonal corner point of a normal image in the film plane enters said rear lens unit at a predetermined height;

when said phototaking zoom lens has said predetermined focal length at wide angle end in said panorama state, a principal ray enters said rear lens unit at a height substantially equal to or less than said predetermined height.

* * * * *